April 30, 1968          E. C. LETTER          3,380,792
THIN FILM OPTICAL SHUTTER
Filed Jan. 3, 1964
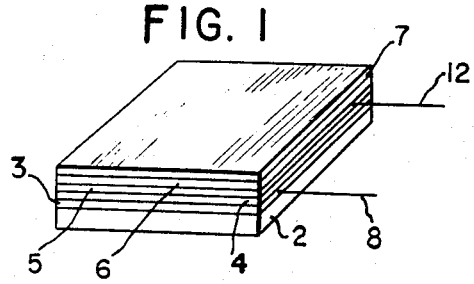
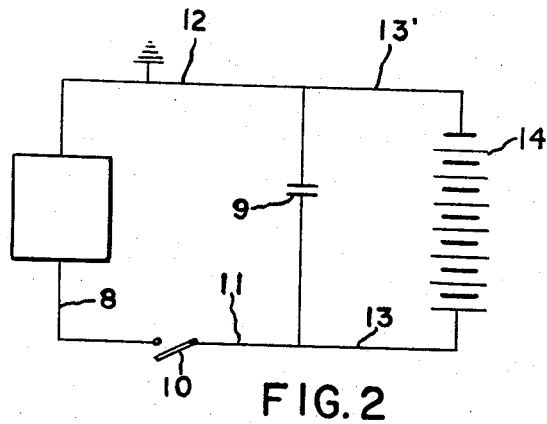
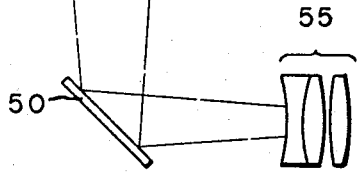
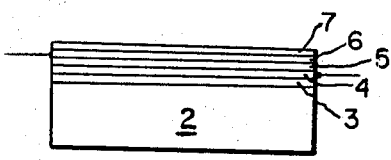
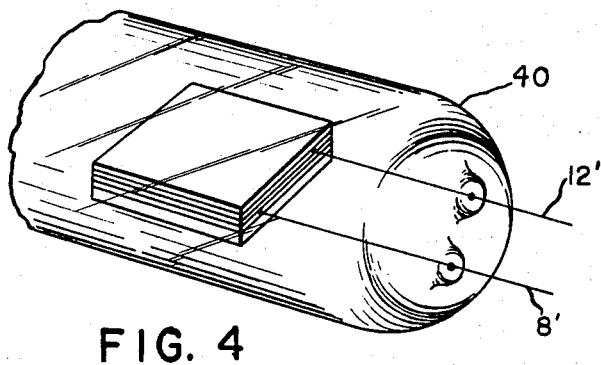
EUGENE C. LETTER
INVENTOR.
BY Frank C. Parker
David E. Dougherty
ATTORNEYS United States Patent Office 3,380,792
Patented Apr. 30, 1968

3,380,792
THIN FILM OPTICAL SHUTTER
Eugene C. Letter, Penfield, N.Y., assignor to Bausch & Lomb Incorporated, Rochester, N.Y., a corporation of New York
Continuation-in-part of application Ser. No. 159,105, Dec. 13, 1961. This application Jan. 3, 1964, Ser. No. 335,693
The portion of the term of the patent subsequent to Dec. 27, 1983, has been disclaimed and dedicated to the Public
5 Claims. (Cl. 350—160)

ABSTRACT OF THE DISCLOSURE

An optical shutter including a pair of conductive films separated by a dielectric and mounted on a substrate forming a reflective element. A pair of electrodes are connected to the conductive films for applying a high voltage between the two films for destroying the films and the reflectivity of the shutter.

This invention relates to an improved optical shutter and more particularly to an improved optical shutter or light valve. The present invention is an improvement on my copending applications for a "High Speed Optical Shutter," Ser. No. 544,929, filed Apr. 25, 1966 as a continuation-in-part of an application Ser. No. 159,105 filed Dec. 13, 1961 now abandoned and "Improved Optical Shutters," Ser. No. 168,974 filed Jan. 26, 1962, now U.S. Patent No. 3,294,469 which are assigned to the same assignee as the present application.

Studies of combustion, corona discharge, explosions, plastic and elastic deformation and shock wave phenomena frequently call for detailed photographs taken at shutter speeds of a few microseconds. Ballistics dynamic testing and chemical reactions also require pictures taken at similar speeds. At relatively high speeds, it is desirable to shutter a relatively large aperture. The relatively large aperture allows adequate light to enter the optical shutter during the short time intervals.

A high speed optical shutter according to the present invention may be opened or closed in less than 25 microseconds. In some cases the opening or closing speed approaches one microsecond. A system of this type may be used in combination with framing cameras. Further, because of the relatively large aperture therein i.e., approximately 1" square, the devices are particularly applicable in any area requiring a relatively high speed light valve.

Advantageously, a shutter or light valve according to the invention may be triggered by an event itself. For example, a flash of light may be used to trigger the valve or electronic means may be incorporated for that purpose.

Briefly, an optical element according to the present invention includes a mirror comprising a substrate, a pair of electrically conducting thin films and a dielectric film separating the electrically conducting films. The films are deposited on the substrate and each of the electrically conducting films is connected to means for producing a high voltage discharge. A discharge is produced across the pair of films to thereby destroy the reflectivity and change the condition of the shutter. In some cases it is desirable to place the opaque or reflecting surface i.e., the electrically conducting thin film and substrate in an inert gas. Helium has been found to be the most desirable of the inert gases, however, air is also a satisfactory atmosphere.

According to a preferred embodiment of the invention, a dielectric film of approximately ¼ wavelength thick is deposited on the substrate between the substrate and a first of the electrically conducting films. The wavelength used to indicate the optical thickness is near the middle of the spectral region over which improved transmission is desired. For example, a ¼ wavelength optical thickness selected from near the middle of the visible region of the spectrum would act as an anti-reflectant and improve the transmission of visible light.

It is also contemplated to deposit $SiO_2$ on a high index glass substrate in order to obtain advantageous results.

It may also be desirable to deposit a similar dielectric film on top of the second electrically conducting film. The second film also tends to impair the optical characteristics of the device.

The invention will now be described in connection with the accompanying drawings; in which, FIG. 1 is a perspective view showing a shutter according to a first embodiment of the invention;

FIG. 2 is a schematic illustration of a shutter such as the one shown in FIG. 1 and including means for opening or closing the shutter;

FIG. 3 is a cross-sectional view of the shutter shown in FIG. 1;

FIG. 4 is a perspective view illustrating a shutter according to the invention disposed in an inert atmosphere; and FIG. 5 is a schematic illustration showing an optical system including an improved optical shutter according to the present invention.

The first embodiment of the invention will be described in connection with FIGS. 1 through 3 wherein like reference numerals have been used to indicate similar parts. A substrate 2 preferably of glass has a relatively thin dielectric film 3 deposited thereon. A relatively thin electrically conducting film 4 is deposited on top of the dielectric film 3. The film 4 may consist of aluminum, magnesium, an alloy containing aluminum or magnesium, or some other suitable material such as silver. An aluminum film is utilized in the presently preferred embodiment of the invention. However, other materials are also satisfactory. The thickness of the aluminum film is such that it has an optical density of approximately 2.0 to 4.0.

A second dielectric film 5 having a thickness of approximately $10/4\lambda$ is deposited on top of the film 4. The film 5 separates the electrically conducting film 4 from a second electrically conducting film 6. The thickness of this film 6 is such that its optical density is approximately 2.0 to 4.0. In some cases it is also desirable to deposit a third dielectric film 7 such as a layer of silicon dioxide approximately $\frac{1}{2}\lambda$ thick on top of the film 6. The layer of silicon dioxide acts as a protective coating and protects the electrically conducting film 6 from damage by physical abrasion.

An electrically conducting film 4 is connected by a lead 8 to a switch 10. The switch 10 is connected to a capacitor 9 by a lead 11. The capacitor 9 is also connected to the second electrically conducting film 6 by means of a lead 12. Means 14 for producing a high voltage discharge of between 2,000 and 10,000 volts is connected to the capacitor 9 by a pair of electric conducting leads 13, 13'. The two films 4 and 6 are connected in parallel with the capacitor 9 when the switch 10 is closed. The capacitor 9 may, for example, have a capacitance of between $\frac{1}{10}$ and 2 microfarads. The capacitor 9 is charged by the high voltage supply 14 and discharges across the pair of films 4 and 6 when the switch 10 is closed. The electric discharge passing through the pair of films destroys the films 4 and 6 to thereby open or close the shutter.

FIG. 4 illustrates a second embodiment of the invention wherein a shutter assembly such as the one shown in FIG. 1 is disposed in an inert gas. As illustrated in FIG. 4, the assembly is connected by the leads 8′, 12′ to the outside of an envelope 40. The envelope 40 contains an inert gas such as helium. The leads are connected to a capacitor and voltage supply (not shown) according to the schematic diagram shown in FIG. 2.

In making a shutter according to the invention, it has been found desirable to evaporate a magnesium fluoride film onto the surface of the shutter prior to depositing the electrical conducting layers. The substrate should be thoroughly cleaned prior to making the deposition in order to improve the uniformity of the layers. Conventional evaporation techniques are used to deposit the electrically conducting films and the dielectric film separating the electrically conducting films. Similarly, conventional techniques are used to apply a protective coating over the second electrically conducting film.

The schematic illustration shown in FIG. 5 shows a shutter 50 according to the present invention as it might be used in an optical device. As illustrated, the light rays are reflected into the device by an inclined mirror 52 through a lens 54 and onto the shutter 50. The reflective surface of the shutter 50 directs the light rays incident thereupon toward a lens assembly 55. The lens assembly 55 may be a camera lens or other lens for forming an image at a selected image plane. When the reflectivity of the shutter 50 is destroyed, the light rays are not reflected thereby but pass through the shutter 50 thereby missing the assembly 55.

What is claimed is:
1. An optical shutter comprising:
   a reflective element including first and second electrically conducting thin films, a dielectric film separating said electrically conducting thin films and a substrate supporting said films, and
   first and second electrodes connected to said first and second electrically conducting films respectively for connection across a sufficient high voltage source for current flow therebetween to destroy said films and the reflectivity of said reflective element.

2. An optical shutter according to claim 1 in which said electrically conducting films consist essentially of aluminum.

3. An optical shutter according to claim 1 in which the electrically conducting films have an optical density of about 2 to 4 and said dielectric film separating said pair of electrically conducting films consist essentially of magnesium fluoride having a thickness of about ten-quarters wavelengths of light.

4. An optical shutter according to claim 1 in which a thin film of magnesium fluoride separates said first electrically conducting film from said substrate, and a layer of silicon dioxide about one-half wavelength thickness is deposited on said second electrically conducting film to thereby protect said second film.

5. An optical shutter according to claim 4 in which the means for producing a high voltage discharge includes a capacitor having a capacitance of between $1/10$ and 2 microfarads and electrical means producing between 2,000 and 10,000 volts.

References Cited

UNITED STATES PATENTS

| | | | |
|---|---|---|---|
| 2,352,085 | 6/1944 | Dimmick | 350—164 |
| 2,478,385 | 8/1949 | Gaiser | 350—164 |
| 2,750,832 | 6/1956 | Morgan | 350—164 |
| 3,294,469 | 12/1966 | Letter | 350—163 |

OTHER REFERENCES

Muirhead et al., Rapid-Opening Electronically-Operated Shutter Rev. Sci. Instruments, vol. 32, No. 10 (Oct. 1961) pp. 1148 and 1149.

JEWELL H. PEDERSEN, *Primary Examiner.*

W. L. SIKES, *Assistant Examiner.*